United States Patent [19]

Watanabe

[11] 4,076,256
[45] Feb. 28, 1978

[54] STYLUS SHIFT MECHANISM FOR A PHONOGRAPH HAVING TWO CONCENTRIC RECORDS

[75] Inventor: Katsumi Watanabe, Kawasaki, Japan

[73] Assignee: Ozen Co., Ltd., Tokyo, Japan

[21] Appl. No.: 705,957

[22] Filed: Jul. 16, 1976

[30] Foreign Application Priority Data

Apr. 1, 1976 Japan .................................. 51-36275

[51] Int. Cl.² ........................... G11B 3/34; G11B 3/80
[52] U.S. Cl. .................................. 274/1 R; 274/13 A; 274/42 R
[58] Field of Search ................. 274/1 R, 1 A, 13 A, 274/42 R; 58/14, 152 B; 35/8 A; 46/177

[56] References Cited

U.S. PATENT DOCUMENTS

| 671,513 | 4/1901 | Goald | 274/13 A |
|---|---|---|---|
| 2,680,150 | 6/1954 | Weld | 58/14 UX |
| 3,581,410 | 6/1971 | Zeigner | 274/1 A |
| 3,801,110 | 4/1974 | Licitis | 274/42 R |

FOREIGN PATENT DOCUMENTS 331,429 7/1930 United Kingdom .............. 274/13 A

*Primary Examiner*—Steven L. Stephan
*Attorney, Agent, or Firm*—Irving M. Weiner; Pamela S. Austin

[57] ABSTRACT

A toy phonograph of the type having an annular outer record, and an inner record arranged concentrically inwardly of the outer record for simultaneous rotation therewith, with the outer record having its grooved top surface disposed slightly higher than that of the inner record. For shifting a reproducing stylus from the outer to the inner record across a spacing therebetween during playback, a shift stylus is carried by a pickup arm at the rear of the reproducing stylus. Shorter than the reproducing stylus, the shift stylus is adapted to ride in a groove in the outer record to permit the reproducing stylus to be carried across the spacing between the records by the pickup arm. The reproducing stylus engages and starts following a groove in the inner record as the shift stylus leaves the outer record.

6 Claims, 2 Drawing Figures

STYLUS SHIFT MECHANISM FOR A PHONOGRAPH HAVING TWO CONCENTRIC RECORDS

BACKGROUND OF THE INVENTION

1. Field of the Invention

This invention relates to toy sound reproducing apparatus, and more specifically to a toy phonograph of the type having an annular outer record and an inner record arranged concentrically for simultaneous rotation. Still more specifically, the invention is directed to improvements in a mechanism for shifting a reproducing stylus from the outer to the inner record during playback in such a dual-record toy phonograph.

2. Description of the Prior Art

The dual-record phonograph in question is suitable to be incorporated in a doll or other toy, for reproduction of short sayings or other sounds. Both outer and inner records used in the phonograph are usually of the type having a plurality of grooves recorded therein in the shape of nested spirals, although in some instances the inner record only may be of that type. The phonograph with such records is equipped with a random playback mechanism whereby, as a pickup arm is moved to the perimeter of the outer record before each playing, the reproducing stylus carried thereby is enabled to randomly select and engage one of the nested spiral grooves for playback.

Thus, if the grooves in the inner record are also played back in a random sequence, the entertainment provided by the toy will be further enhanced by the element of surprise arising from the random reproduction of the various recorded sayings in different combinations. If each of the outer and inner records has ten nested spiral grooves formed therein, then, at least theoretically, the sayings recorded in the respective grooves can be played back in a hundred different combinations.

For shifting the reproducing stylus from the outer to the inner record during playback, there has heretofore been employed a pickup arm having a slanting guide surface formed at the bottom of its stylus carrying end, just at the rear of the stylus. The outer and inner records are mounted concentrically on a common turntable, with a slight spacing therebetween and with the grooved top surface of the outer record disposed slightly higher than that of the inner record. As the reproducing stylus leaves the outer record upon completion of playback from one of its grooves, therefore, the guide surface of the pickup arm drops onto the inside shoulder of the outer record and slides down thereover under the weight of the arm and stylus until the stylus engages one of the grooves in the inner record after traveling across the spacing between the two records.

This known stylus shift mechanism has the disadvantage that the guide surface of the pickup arm and the inside shoulder of the outer record are easy to be worn or damaged in use, as the former repeatedly strikes against the latter and slides thereover. As a consequence, the reproducing stylus may become unable to be shifted to a desired position on the inner record or, in the worst case, may be caught between the outer and inner records.

SUMMARY OF THE INVENTION

It is an object of this invention to provide an improved stylus shift mechanism for dual-record phonograph whereby the reproducing stylus can be positively shifted from an outer to an inner record during playback.

Another object of the invention is to provide a stylus shift mechanism which can be easily incorporated in a dual-record phonograph of known construction and which is of such simplicity as will not add appreciably to the expense of the phonograph.

Briefly, the stylus shift mechanism according to the invention is characterized by a shift stylus mounted on the free end of a pivotal pickup arm, in addition to the usual reproducing stylus. This shift stylus is adapted to ride in a groove in the outer record during the shifting of the reproducing stylus from the outer to the inner record.

The shift stylus can be located at the rear of the reproducing stylus with respect to the direction of travel of the pickup arm over the records during playback, with a spacing between the two styli which is greater than the spacing between the outer and inner records. In the dual-record phonograph under consideration, the grooved top surface of the annular outer record is higher than that of the inner record, so that the shift stylus is made shorter than the reproducing stylus by a length equal to or slightly less than the difference in height between the top surfaces of the records.

Thus, as the reproducing stylus leaves the outer record upon completion of playback from one of its grooves, the shift stylus engages one of the outer record grooves. Since the records are in continuous rotation during playback, the reproducing stylus is compelled to traverse the spacing between the records as the shift stylus follows the outer record groove to its terminal point. Such a forced shift of the reproducing stylus is in contrast to the aforementioned prior art method of shifting the stylus by the sliding of the pickup arm under its own weight. The stylus shift mechanism according to the invention is therefore more positive in operation than the prior art.

The above and other objects, features and advantages of this invention and the manner of attaining them will become more apparent, and the invention itself will best be understood, upon consideration of the following description of a preferred embodiment taken in connection with the accompanying drawings.

DESCRIPTION OF THE PREFERRED EMBODIMENT

Figure 1:
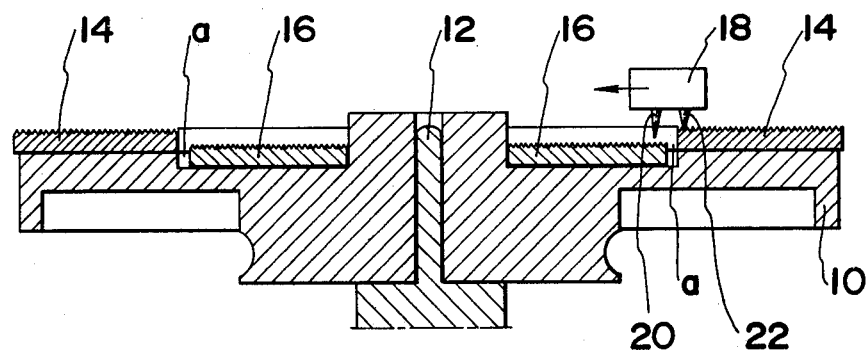
FIG. 1 is a vertical axial sectional view of a turntable and-record assembly of a dual-record toy phonograph shown together with the stylus shift mechanism according to this invention.

In FIG. 1 of the accompanying drawings the stylus shift mechanism according to the invention is shown together with a typical turntable-and-record arrangement of a dual-record toy phonograph. The reference numeral 10 in the drawing designates a turntable fixedly mounted on a spindle 12 which is to be rotated by a drive mechanism, not shown, of any known or suitable type.

Mounted on the turntable 10, usually irreplaceably, are an annular outer record 14 and an inner record 16, the latter being arranged inwardly of the former. The outer and inner records 14 and 16 are disposed concentrically, both centered about the spindle 12, and a predetermined spacing $a$ exists between the two records. It should also be noted that the grooved top surface of the outer record 14 is disposed in a plane higher than and parallel to the plane of the grooved top surface of the inner record 16.

Usually, the outer and inner records 14 and 16 are both of the type having a plurality of grooves formed therein in the shape of nested spirals, with the grooves containing different recorded sayings or other sounds. The toy phonograph incorporating such records is equipped with a random playback mechanism, not shown, for randomly selecting one of the several grooves in the outer record so that the various recorded sayings may be played back in an utterly unpredictable sequence. There are numerous known types of random playback mechanisms, and the means of this invention are believed to be adaptable for use with an desired one of such various types of mechanisms.

Shown at 18 is a pickup arm pivotally supported at one end in a conventional manner. A reproducing stylus 20 is carried at the other end of the pickup arm 18 and extends downwardly therefrom so as to ride in any of the grooves in the outer and inner records 14 and 16.

The stylus shift mechanism according to the invention comprises a shift stylus 22 extending downwardly from the said other end of the pickup arm 18. The shift stylus is disposed rearwardly of the reproducing stylus 20 with respect to the direction of travel of the pickup arm over the outer and inner records during playback, which direction is indicated by the arrow in the drawings.

Figure 2:
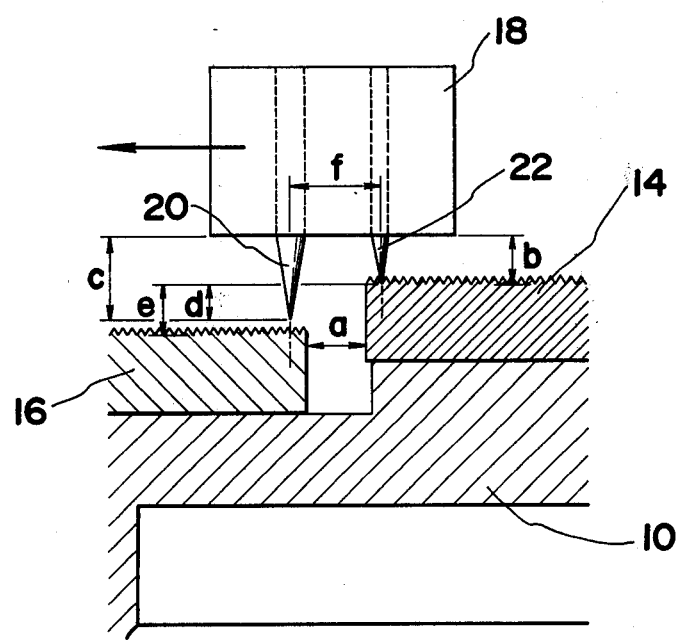
FIG. 2 is a detail view showing part of the arrangement of FIG. 1 on an enlarged scale.

As illustrated in greater detail in FIG. 2, the length $b$ of the shift stylus 22 is less than the length $c$ of the reproducing stylus 20 by a length $d$ which is equal to, preferably slightly less than, the difference $e$ in height between the grooved top surfaces of the outer and inner records 14 and 16. The relationship between the lengths $b$ and $c$ of the shift stylus and the reproducing stylus can be summarized as follows:

$$b = c - d$$

$$0 < d \leq e$$

Further, the pitch spacing $f$ between the reproducing stylus 20 and the shift stylus 22 is greater than the spacing $a$ between the outer and the inner records 14 and 16. It should be noted that by the term "pitch spacing" as used herein and in the appended claims is meant the perpendicular distance between the vertical lines passing the pointed tips of the two styli, as will be clearly seen from FIG. 2.

In the operation of the dual-record toy phonograph, the reproducing stylus 20 may randomly select for playback and engage one of the nested spiral grooves in the outer record 14 at its perimeter either before or after the turntable 10 is set in rotation by the unshown drive mechanism. With the rotation of the outer record, the pickup arm 18 travels in the arrow-marked direction as the reproducing stylus follows the randomly selected groove. The mechanical vibrations set up in the pickup arm via the reproducing stylus are directly transmitted (i.e., without the process of electrical amplification) to a loudspeaker diaphragm, not shown, which may be mounted over the turntable, thereby causing same to produce the corresponding audible sound waves.

Upon completion of playback from the selected groove in the outer record 14, the reproducing stylus 20 moves into the spacing between the outer and inner records and drops therein until the shift stylus 22 engages one of the grooves in the outer record. With the continued rotation of the turntable 10, the shift stylus 22 follows the groove in the outer record, so that the pickup arm 18 is compelled to continue traveling in the arrow marked direction until the shift stylus also leaves the outer record groove at its inner extremity.

If the pitch spacing $f$ between the reproducing stylus 20 and the shift stylus 22 is greater than the spacing $a$ between the outer and the inner records 14 and 16, and if the difference in length between the two styli is less than the difference in height between the grooved top surfaces of the two records, as shown in FIG. 2, then the reproducing stylus will engage one of the nested spiral grooves in the inner record simultaneously when the shift stylus leaves the outer record.

In this manner the reproducing stylus 20 smoothly and positively shifts from the outer to the inner record, and the pickup arm 18 travels without a standstill toward the center of the turntable. The recording saying in the selected groove in the inner record is of course also played back in the above described manner.

As will be apparent, no sound should preferably be recorded in those portions of the grooves in the outer record 14 where the shift stylus 22 is to ride during shift of the reproducting stylus 22 from the outer to the inner record. This is to prevent sound reproduction by the shift stylus during the shift of the reproducing stylus.

While the stylus shift mechanism according to this invention has been shown and described herein in terms of its specific form, it is understood that the invention itself is not to be restricted by the exact details of this disclosure. For example, while the outer and inner records are shown to be of equal thickness and mounted on the stepped face of the turntable, it is of course possible to make the outer record greater in thickness than the inner record and to mount the records of such different thickness on a planar turntable face. Further, the outer and inner records may be integrally interconnected at their bottom portions, and still further, the records may be molded integral with the turntable. All these and other modifications or variations which are apparent to those skilled in the art are understood to fall within the scope of this invention as sought to be defined by the following claims.

What is claimed is:

1. In a phonograph of the type having an annular outer record and an inner record arranged concentrically for simultaneous rotation, the improvement comprising a pickup arm pivotally supported at one end, a reproducing stylus carried by said pickup arm at the other end thereof, and a shift stylus also carried by said pickup arm at said other end thereof, said reproducing stylus being adapted to play the outer record then the inner record, said shift stylus being adapted to ride in a groove in the outer record while said reproducing stylus shifts from the outer to the inner record during playback.

2. The improvement in accordance with claim 1, wherein:
   said outer record has a top surface disposed higher than the top surface of said inner record; and
   said shift stylus is shorter than said reproducing stylus.

3. In a phonograph of the type having an annular outer record and an inner record arranged concentrically for simultaneous rotation, there being a spacing between the outer and inner records, the improvement comprising a pickup arm pivotally supported at one end, a reproducing stylus carried by said pickup arm at the other end thereof, and a shift stylus also carried by said pickup arm at said other end thereof and located rearwardly of said reproducing stylus with respect to the direction of travel of said pickup arm over the outer and inner records during playback, said shift stylus being adapted to engage a groove in the outer record when said reproducing stylus moves into the spacing between the outer and inner records upon completion of playback from the outer record and to remain in engagement with the groove in the outer record until, with the continued rotation of the outer and inner records, said reproducing stylus is carried over the inner record by said pickup arm, whereby said reproducing stylus is permitted to engage and start following a groove in the inner record when said shift stylus moves out of engagement with the groove in the outer record.

4. The improvement in accordance with claim 3, wherein:
   said outer record has a top surface disposed higher than the top surface of said inner record; and
   said shift stylus is shorter than said reproducing stylus.

5. In a phonograph of the type having an annular outer record, and an inner record arranged concentrically with and inwardly of the outer record for simultaneous rotation therewith, with the outer record having a grooved top surface disposed higher than the grooved top surface of the inner record, there being a predetermined spacing between the outer and inner records, the improvement comprising a pickup arm pivotally supported at one end, a reproducing stylus carried by said pickup arm at the other end thereof, and a shift stylus also carried by said pickup arm at said other end thereof, said shift stylus being located rearwardly of said reproducing stylus with respect to the direction of travel of said pickup arm over the outer and inner records during playback, with a pitch spacing between said reproducing stylus and said shift stylus greater than said predetermined spacing between the outer and inner records, said shift stylus being shorter than said reproducing stylus by a length at most equal to the difference between the heights of the grooved top surfaces of the outer and inner records, whereby said reproducing stylus is permitted to shift from the outer to the inner record while said shift stylus is riding in a groove in the outer record.

6. The improvement in accordance with claim 5, wherein:
   said groove in which said shift stylus rides while said reproducing stylus is permitted to shift from the outer to the inner record is provided with no sound recordings, to prevent sound reproduction by said shift stylus during said shift of said reproducing stylus.

* * * * *